(No Model.)  4 Sheets—Sheet 1.

D. J. MILLER & C. F. FINDLAY.
TRACTION ROPE RAILWAY.

No. 281,284.  Patented July 17, 1883.

Witnesses:
O. Lundquist.
R. M. Johnson.

Inventors:
D. J. Miller
C. F. Findlay  By D. J. Miller (No Model.) 4 Sheets—Sheet 2.

D. J. MILLER & C. F. FINDLAY.
TRACTION ROPE RAILWAY.

No. 281,284. Patented July 17, 1883.

Witnesses: Inventors.

(No Model.) 4 Sheets—Sheet 3.

D. J. MILLER & C. F. FINDLAY.
TRACTION ROPE RAILWAY.

No. 281,284. Patented July 17, 1883.

Witnesses:
O. Lundquist
R. M. Johnson

Inventors,
D. J. Miller
C. F. Findlay By D. J. Miller (No Model.) 4 Sheets—Sheet 4.
D. J. MILLER & C. F. FINDLAY.
TRACTION ROPE RAILWAY.
No. 281,284. Patented July 17, 1883.
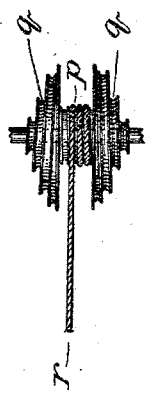
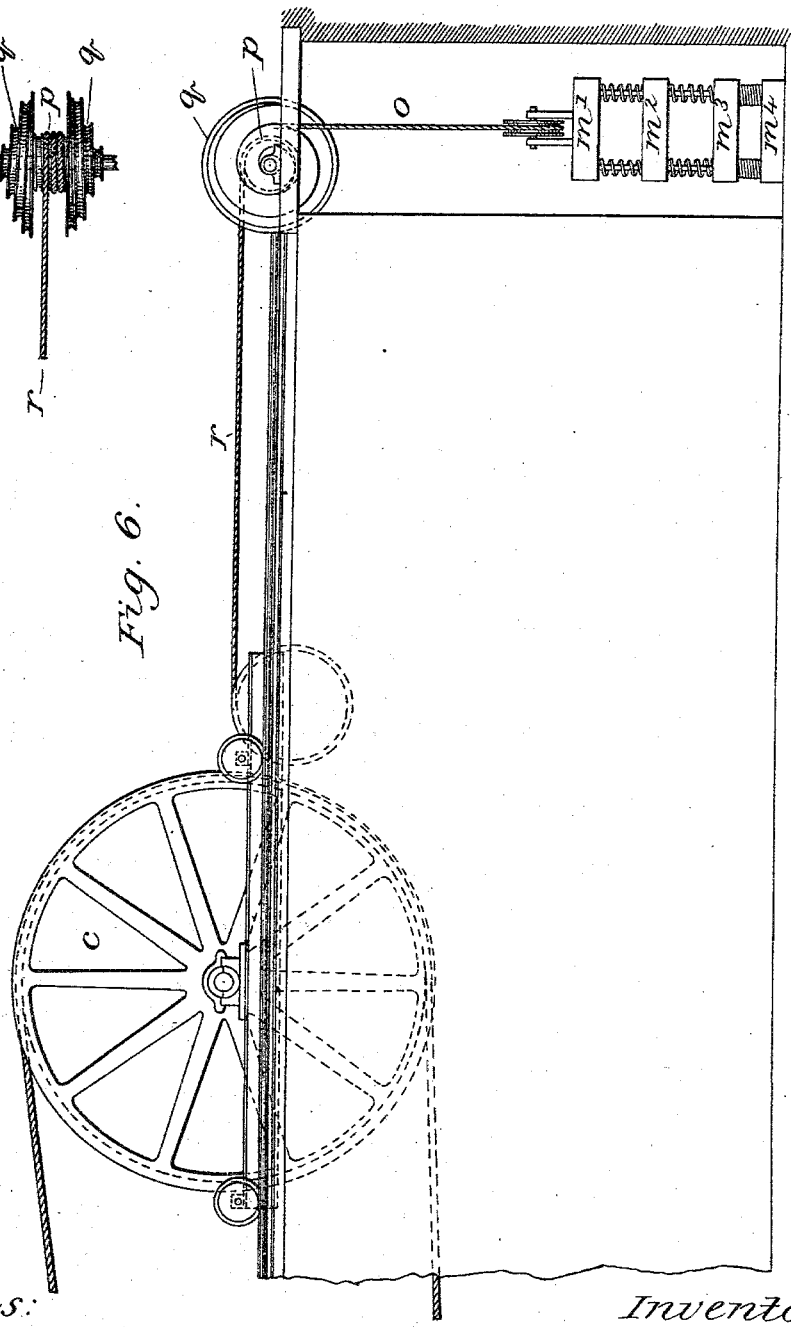
Witnesses:
O. Lundquist
R. M. Johnson
Inventors.
D. J. Miller
C. F. Findlay By D. J. Miller

UNITED STATES PATENT OFFICE.

DANIEL J. MILLER AND CHARLES F. FINDLAY, OF CHICAGO, ILLINOIS.

TRACTION-ROPE RAILWAY.

SPECIFICATION forming part of Letters Patent No. 281,284, dated July 17, 1883.

Application filed August 1, 1882. (No model.)

*To all whom it may concern:*

Be it known that we, DANIEL J. MILLER, a citizen of the United States, and CHARLES FARQUHAR FINDLAY, a citizen of Great Britain, residing in Chicago, county of Cook, and State of Illinois, have invented certain new and useful Improvements in Traction-Rope Railways, of which the following is a specification.

Our invention relates to the details for operating duplicate cables—first, to carrying or supporting pulleys; second, to certain arrangements whereby two traction-cables may be taken around a curve without interfering with each other; third, to pulleys of a special form for guiding and keeping the cable in its proper channel.

Our invention further relates to a smaller cable traveling at a high speed in the same tunnel with the traction-cables, as is fully set forth hereinafter; and our invention relates, also, to an automatic variable tension on the traction-cable, and details of the same.

Figure 1:
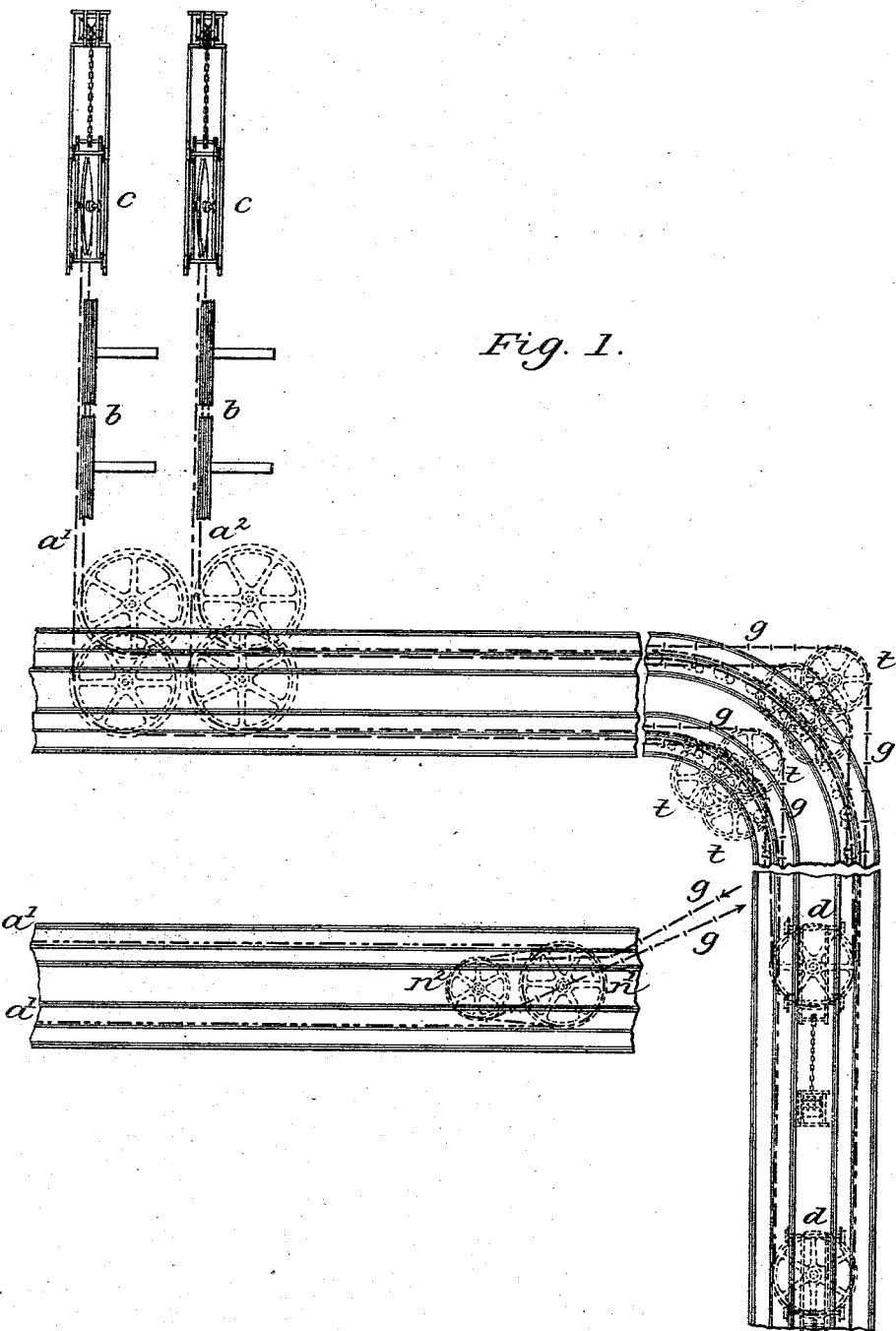
Figure 2:
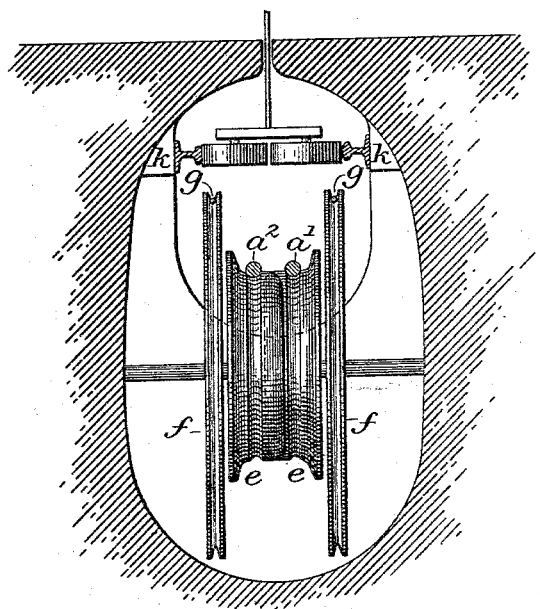
Figure 3:
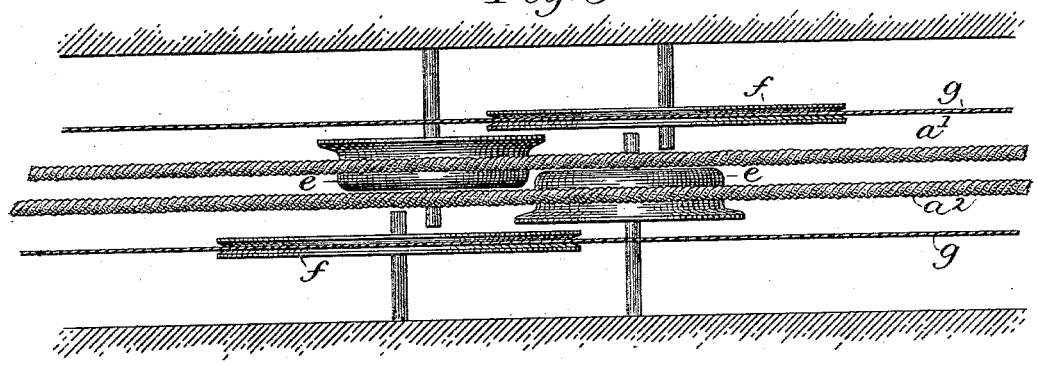
Figure 4:
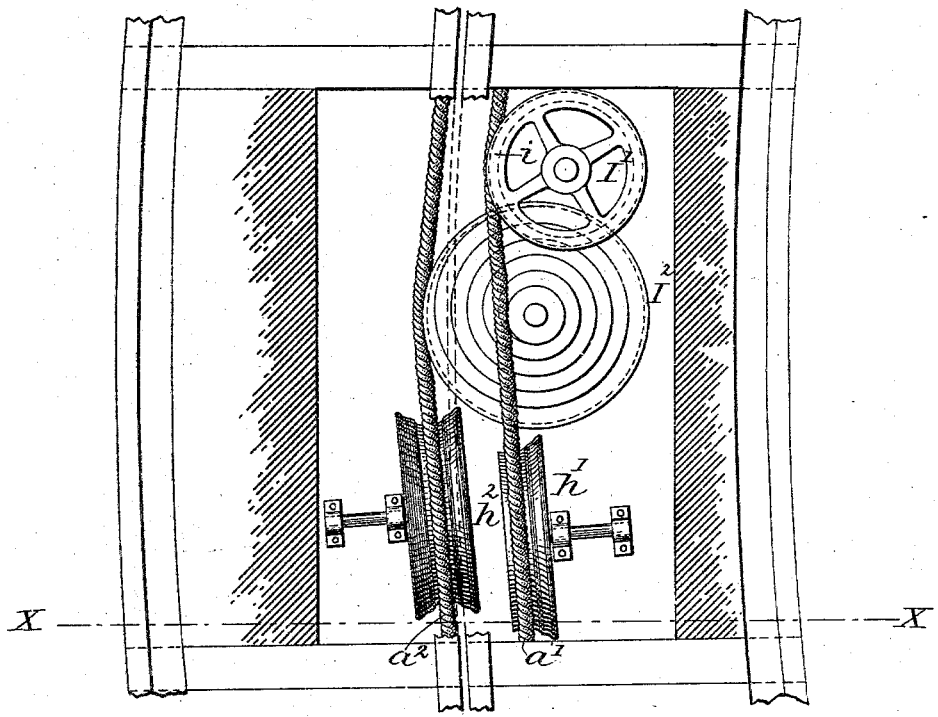
Figure 5:
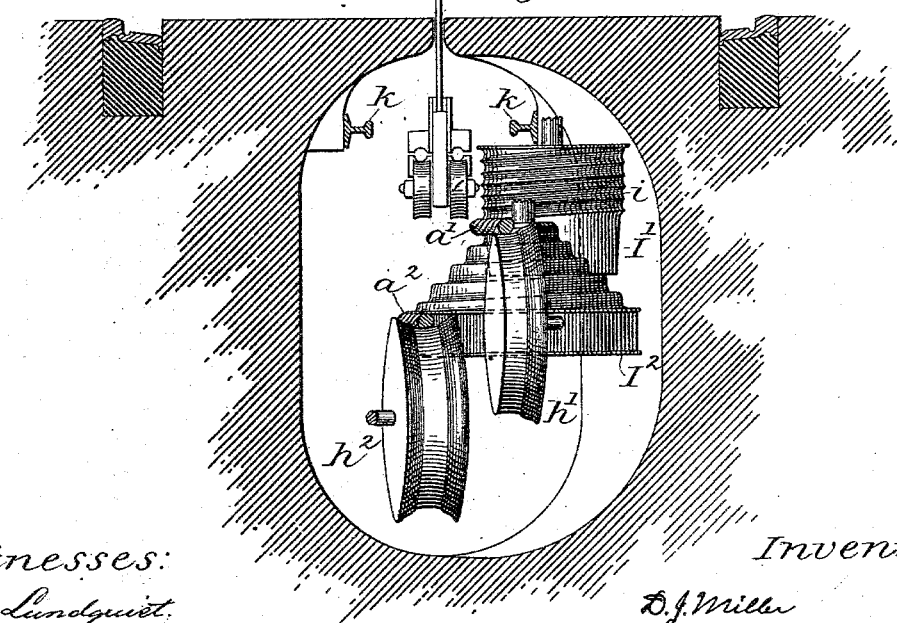

Figure 1 is a plan of the railway, showing the general position of such machinery connected with it as our invention relates to. Fig. 2 is a cross-section of the tunnel where the line is straight. Fig. 3 is a plan of the pulleys and cables in Fig. 2. Fig. 4 is a detailed plan of part of the tunnel where the line is curved. Fig. 5 is a cross-section of Fig. 4 at line $x\ x$. Fig. 6 is a side elevation of the tension-wheel apparatus, and Fig. 7 is a plan of the fusee $q$ and drum $p$ in Fig. 6.

In Fig. 1, $a'\ a^2$ are the two traction-cables, traveling in one tunnel in the same direction, as described in the specifications of patents applied for by us and filed in the United States Patent Office March 31, 1882, No. 56,895.

$b\ b$ represent the driving-drums of the two cables. The cables pass from these drums around tension-wheels $c\ c$, and thence around horizontal wheels into the tunnel. At the extreme end of the line the cables pass around wheels $d\ d$, which are mounted on carriages free to traverse a track just the same as tension-wheels $c\ c$, and are held back by a chain or rope, which is connected to a tension-weight.

In Figs. 2 and 3, $e\ e$ are the carrying-pulleys employed where the line is straight. They are formed with a flange on that side farthest from the center of the tunnel, to prevent the cable from leaving the pulley on the outer side, but have no flange, or only a small flange, on the inner side, as a large flange would interfere with the other cable; and the cable, if it should for a moment get out of its true line toward the center of the tunnel, would be supported by the pulley of the other cable, without damage, until its tension restored it to its proper place.

$f\ f$ are pulleys placed in the same tunnel to carry a smaller cable, $g$, which travels at a high speed, to transmit power to some distant point on the line to the main or traction cables, thus relieving them (the main cables) of part of the strain they would have if driven from one point only. We are aware that transmitting power by wire rope is not new; but our invention consists in the application of a high-speed cable to operate in combination with the traction-rope of a cable railway. One of the pulleys $f$ carries the outgoing cable and one the incoming cable, and a similar set of pulleys is placed in the tunnel of the other track, carrying a second high-speed cable, thus duplicating this part of the system also. The pulleys $e\ f$ are placed as close together as possible to save excavation, and to be more easily accessible from a single manhole.

$t\ t$ in Fig. 1 are sheaves by which the high-speed cables are guided around the curve. In Fig. 2, $k\ k$ are rails fastened along each side of tunnel, against which run horizontal rollers carried by a frame depending from the body of the car.

In Figs. 4 and 5, $h'\ h^2$ are the carrying-pulleys for the cables $a'\ a^2$, respectively, on a curve; and $I'\ I^2$, the guiding-pulleys for the same cables, $i$ being a spirally-grooved independent pulley arranged upon the same shaft immediately above the pulley $I'$, for the purpose hereinafter explained. The pulley $h'$ is not much wider than is necessary to carry the cable. The cable $a'$ keeps its place against the pulley $i$ and on the pulley $h'$ by its weight and tension. When the grip passes around the curve and brings the cable $a'$ in contact with the pulley $i$, it afterward falls again by its own weight to its place, and to insure its doing so the pulley $i$ is made with shallow spiral grooves, which pay the cable down as the pulley revolves. The line of the cable $a^2$ in passing the curve is lower down, and so far out from the center of the track that the cable, being laid down from the grip, will pass outside the pulley $h'$ and strike the pulley $I^2$, which has a coned shape and spiral grooves of a width nearly equal to the diameter of the cable. The revolution of $I^2$ pays the cable out to its base by means of the spiral grooves. If from any cause the cable $a^2$ comes into contact with pulley $i$, the spiral grooves on the latter would cause it to descend, and not being able to rest on the pulleys $h'$, which are occupied by the cable $a'$, it would find no resting-place until it reached the pulley $I^2$, which would guide it out, as before, to its proper line on the pulley $h^2$.

Our application of the spirally-grooved pulleys is not limited to the curve only, for a pulley with spiral grooves either cylindrical or conical in form, and with its axis either upright or otherwise, may also be used in other parts of the railway, wherever there is a possibility of the cable getting, by any means, out of its true line, in order to guide it back to that line. Pulley $I'$ is smallest in diameter at the base. This is to assist in guiding cable $a^2$ down, should it touch said pulley $I'$. What we wish to cover in this is a horizontal tapering pulley largest at the top, for the purpose of allowing the cable to find its proper place on a curve. The cable (owing to the tension) always runs to the small part of the wheel, and as it is desirable, for many reasons, to have the cable down in its proper place, we propose making the pulleys largest at the top, thus allowing the cable to find its proper line.

Our invention of the duplicate-cable system, as here set forth, further consists of carrying the outer traction-rope at a lower elevation on a curve than the inner rope, for the purpose of enabling them to be operated independently in connection with a double gripper.

In Fig. 6, $c$ is the tension-wheel employed to keep the cable taut. This apparatus may be applied at any part of the line that may seem desirable. The method hitherto adopted has been to suspend a weight so as to pull horizontally on a carriage carrying the tension-wheel. We propose, instead of employing a constant weight for this purpose, to attach to the tension-wheel carriage a chain or rope whose tension is made to vary with the position of the carriage. This variation of tension may be produced in various ways, and we have described and illustrated those devices which seem to us best adapted for this purpose, our invention consisting, however, mainly, in the application of the variable tension to the tension-wheel carriage. The object of this variable tension is to steady the motion of the cars on the track and lessen the rapid changes of speed in the cable, which are excessive under the present arrangements.

Brakes have been used on the tension-carriage, in some cases, to retard the motion of the tension-wheel, and they are objectionable in many ways, as it makes no difference at what point the tension-wheel is stationed, the brakes always apply the same power in any forward movement and release in a reverse movement. What we purpose to produce by our arrangements is an automatic variable tension gradually increasing and decreasing by the movements of the tension-wheel.

In Fig. 6 the chain or rope $r$ is attached to the carriage at one end, and passes around the central part of a drum, $p$, and winds on and off said drum as the carriage moves backward and forward. The drum $p$ is mounted on an axle turning in fixed bearings, and on the same axle, on opposite sides of drum $p$, are fusees $q$, on which are wound the ends of a chain or rope, $o$. The ends of this rope or chain are made fast to the fusee and pass to weight $m'$, from which hangs a second weight, $m^2$, and from this a third weight, $m^3$, and so on. When the tension-wheel is as far back as it can travel, the weight $m'$ only is hanging from the chain $o$, the other weights resting on each other on a fixed support. When the tension-wheel travels forward, the weights are lifted at different intervals. By having these weights properly adjusted any desired tension may be brought to bear on the carriage when in any particular position. As the fusee revolves, the rope $o$ is wound on or off, as the case may be, thus also producing a variable strain. Either the fusee or weights may be used separately to produce this variable strain.

Having thus described our invention, what we claim as new, and desire to secure by Letters Patent, is—

1. In a traction-rope railway, in combination with two independent cables, two independent vertically-supporting pulleys, each provided with a flange upon one side, and arranged, substantially as shown, with said flanges upon that side which is the farthest from the center of the track.

2. The pulleys $h'$ $h^2$ and $I'$ $I^2$, arranged at different elevations on the same curve, in combination with two independent traction-cables, $a'$ and $a^2$, as represented, and for the purpose specified.

3. In connection with curves of a cable railway, two independent traction-ropes, the outer one arranged on the guiding or carrying pulleys at a lower elevation than the inner one, that said cables may be kept separate and operated independently, in combination with a double gripper, for the purpose specified.

4. The pulleys $i$ and $I'$, combined on one shaft and arranged on the curve of a traction-rope railway, substantially as described, and for the purpose specified.

5. In a cable-railway, the combination of the traction cable or cables and gripper with horizontal pulley $I'$, formed as an inverted cone, arranged substantially as described, and for the purpose specified.

6. The combination of spiral grooves with the guiding or carrying pulleys of a traction-rope railway, for the purpose of guiding a cable to its proper place, as specified.

7. In connection with a traction-cable railway, a separate transmitting-cable, $g$, to operate in combination with the traction cable or cables, as here represented, and for the purpose specified.

8. The combination, with the tension-wheel carriage of a traction-cable railway, of a rope or cable and weight and devices, substantially as described, for varying the pull of the said weight upon the carriage.

9. The tension-wheel $c$, in combination with the weights $m'$ $m^2$, &c., and fusee $q$, to operate in connection with the traction-rope of a cable railway, for the purpose specified.

DANIEL J. MILLER.
CHARLES FARQUHAR FINDLAY.

Witnesses:
H. C. GOULDING,
O. LUNDQUIST.